United States Patent
Neisen

(10) Patent No.: US 8,484,945 B2
(45) Date of Patent: Jul. 16, 2013

(54) METHOD FOR MANAGING TEMPERATURES IN AN EXHAUST SYSTEM OF A MOTOR VEHICLE

(75) Inventor: Michael Neisen, Ostrander, OH (US)

(73) Assignee: Honda Motor Co., Ltd., Tokyo (JP)

(*) Notice: Subject to any disclaimer, the term of this patent is extended or adjusted under 35 U.S.C. 154(b) by 363 days.

(21) Appl. No.: 12/837,714

(22) Filed: Jul. 16, 2010

(65) Prior Publication Data
US 2012/0011831 A1  Jan. 19, 2012

(51) Int. Cl.
*F01N 3/00* (2006.01)
(52) U.S. Cl.
USPC .................. 60/285; 60/274; 60/286
(58) Field of Classification Search
USPC .............. 60/274, 286, 298, 300, 320
See application file for complete search history.

(56) References Cited

U.S. PATENT DOCUMENTS

| | | | |
|---|---|---|---|
| 3,650,254 A | 3/1972 | McJones | |
| 4,348,728 A | 9/1982 | Sagisaka et al. | |
| 4,592,325 A | 6/1986 | Nakagawa | |
| 4,823,755 A | 4/1989 | Hirose et al. | |
| 5,067,465 A | 11/1991 | Yamasaki et al. | |
| 5,884,477 A * | 3/1999 | Andou et al. | 60/285 |
| 7,188,468 B2 * | 3/2007 | Fukusako et al. | 60/285 |

FOREIGN PATENT DOCUMENTS

| | | |
|---|---|---|
| JP | 52-153030 | 12/1977 |
| JP | 2005-155422 | 6/2005 |

* cited by examiner

*Primary Examiner* — Thomas Denion
*Assistant Examiner* — Matthew T Largi
(74) *Attorney, Agent, or Firm* — Plumsea Law Group, LLC

(57) ABSTRACT

A method and system for managing temperatures in an exhaust system of a motor vehicle is disclosed. The method includes a step of predicting an overheat condition of a catalyst and a seal mat included in a catalytic converter. The method also includes a step of selecting a fuel enrichment map to determine a fuel delivery amount based on a predicted overheat condition. The method and system further includes providing a fuel enrichment map for an overheat condition of a catalyst that includes fuel delivery amounts that are less than fuel delivery amounts included in a fuel enrichment map for an overheat condition of a seal mat.

20 Claims, 5 Drawing Sheets

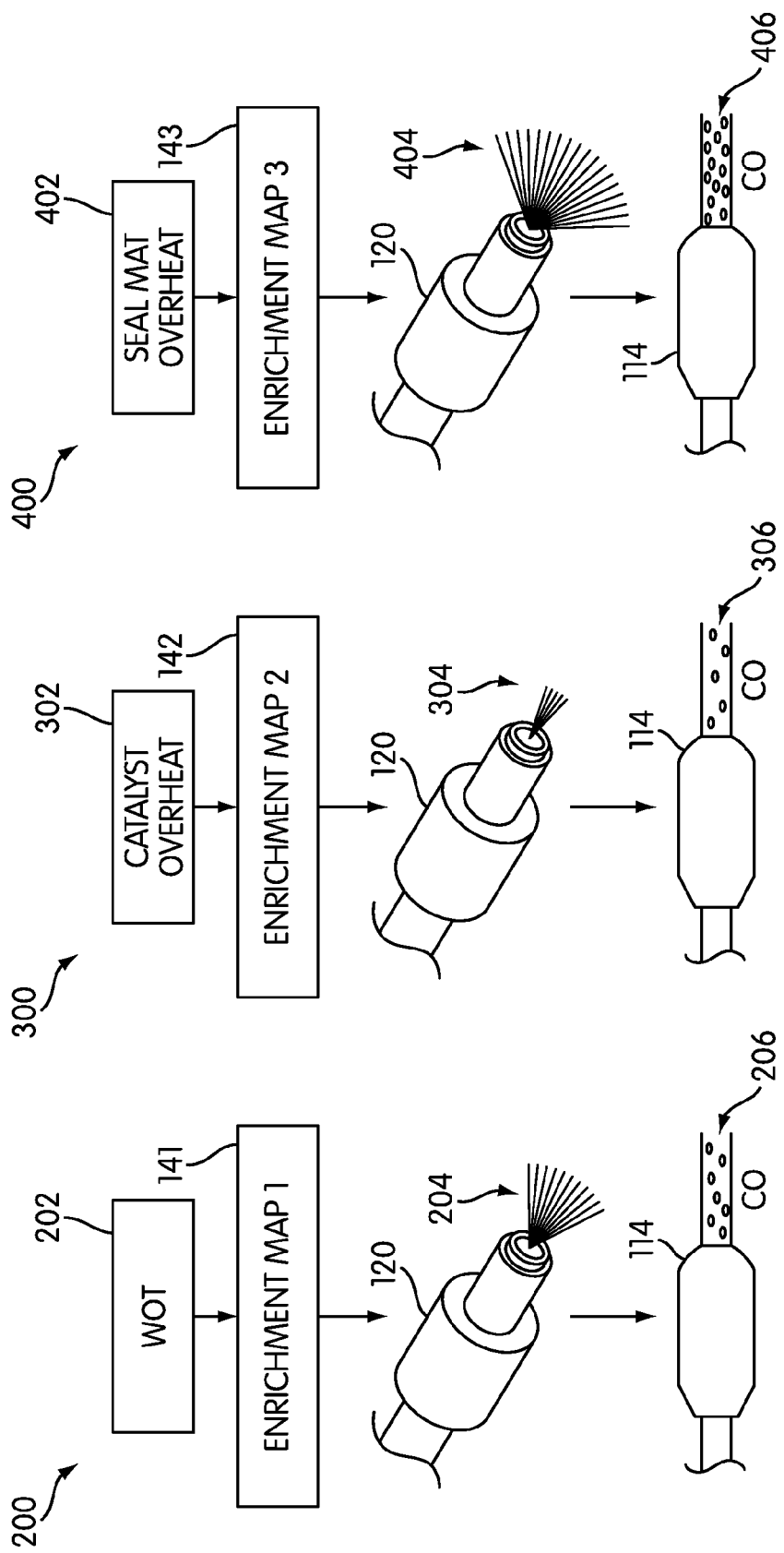

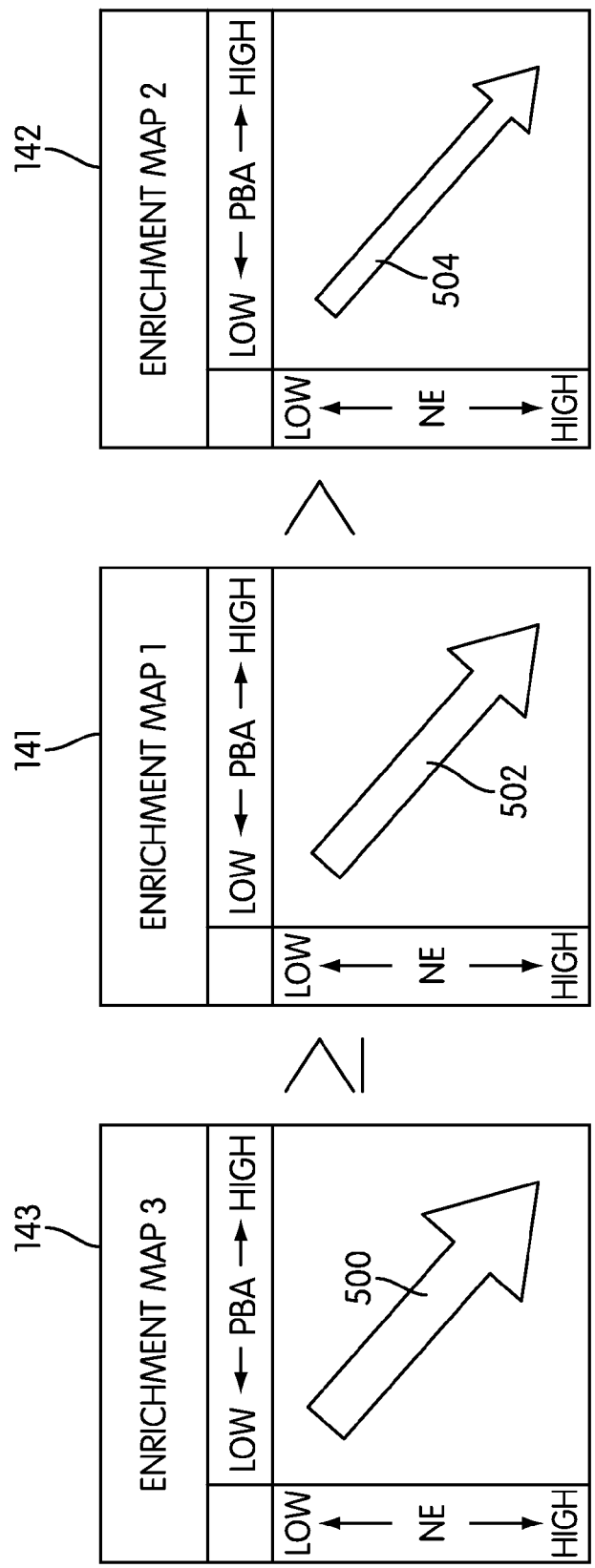

METHOD FOR MANAGING TEMPERATURES IN AN EXHAUST SYSTEM OF A MOTOR VEHICLE

BACKGROUND

The present invention relates generally to a motor vehicle, and in particular to a method for managing temperatures in an exhaust system of a motor vehicle.

Engines in motor vehicles can produce a variety of emissions as products of the combustion process. A number of pollutants can also be produced as emissions from the combustion process. Exhaust systems in motor vehicles are generally equipped with catalytic converters for reducing pollutants contained in the emissions from the engine. Temperatures in an exhaust system can reach elevated levels resulting in damage to one or more components of the catalytic converter.

There exists a need in the art for a method for managing temperatures in an exhaust system of a motor vehicle.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method for managing temperatures in an exhaust system of a motor vehicle by an electronic control unit, comprising the steps of: receiving information associated with a throttle position from a throttle sensor; receiving information associated with an engine of the motor vehicle from a plurality of engine parameter sensors; estimating a first value associated with a temperature of a catalyst disposed in a catalytic converter included in the exhaust system; estimating a second value associated with a temperature of a seal mat disposed in the catalytic converter; predicting an overheat condition of at least one of the catalyst and the seal mat; selecting at least one of: (i) a first fuel delivery amount based on information received from the throttle sensor, (ii) a second fuel delivery amount based on the predicted overheat condition of the catalyst, and (iii) a third fuel delivery amount based on the predicted overheat condition of the seal mat, the first fuel delivery amount and the third fuel delivery amount each being larger than the second fuel delivery amount; generating a signal associated with the selected at least one of the first fuel delivery amount, the second fuel delivery amount, and the third fuel delivery amount to control at least one fuel injector associated with an engine of the motor vehicle; and sending the signal to the at least one fuel injector.

In another aspect, the invention provides a method for managing temperatures in an exhaust system of a motor vehicle by an electronic control unit, comprising the steps of: receiving information associated with a throttle position from a throttle sensor; setting a first fuel delivery amount based on the information received from the throttle sensor; receiving information associated with an engine of the motor vehicle from a plurality of engine parameter sensors; predicting an overheat condition of a catalyst disposed in a catalytic converter included in the exhaust system based on the information received from the plurality of engine parameter sensors; setting a second fuel delivery amount based on the predicted overheat condition of the catalyst; predicting an overheat condition of a seal mat disposed in the catalytic converter based on the information received from the plurality of engine parameter sensors; setting a third fuel delivery amount based on the predicted overheat condition of the seal mat; selecting the largest of the first fuel delivery amount, the second fuel delivery amount, and the third fuel delivery amount as a commanded fuel delivery amount; generating a signal associated with the commanded fuel delivery amount to control at least one fuel injector associated with an engine of the motor vehicle; and sending the signal to the at least one fuel injector.

In another aspect, the invention provides a control system in a motor vehicle for managing temperatures in an exhaust system of the motor vehicle, comprising: an engine including at least one fuel injector and a plurality of engine parameter sensors configured to transmit information associated with operating conditions of the engine; a throttle sensor configured to transmit information associated with a throttle position of the engine; an exhaust system comprising a catalytic converter including a catalyst and a seal mat; an electronic control unit in communication with at least the at least one fuel injector, the throttle sensor, and the plurality of engine parameter sensors; the electronic control unit configured to estimate a first value associated with a temperature of the catalyst and a second value associated with a temperature of the seal mat, and to predict an overheat condition of at least one of the catalyst and the seal mat; wherein the electronic control unit is configured to select at least one of: (i) a first fuel delivery amount based on information received from the throttle sensor, (ii) a second fuel delivery amount based on the predicted overheat condition of the catalyst, and (iii) a third fuel delivery amount based on the predicted overheat condition of the seal mat, the first fuel delivery amount and the third fuel delivery amount each being larger than the second fuel delivery amount; wherein the electronic control unit is configured to generate a signal associated with the selected at least one of the first fuel delivery amount, the second fuel delivery amount, and the third fuel delivery amount to control the at least one fuel injector.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 2 is a representational view of an exemplary embodiment of a fuel enrichment scenario;

FIG. 3 is a representational view of an exemplary embodiment of a fuel enrichment scenario;

FIG. 4 is a representational view of an exemplary embodiment of a fuel enrichment scenario;

FIG. 5 is a representational view illustrating an exemplary relationship between three fuel enrichment maps;

DETAILED DESCRIPTION

Figure 1:
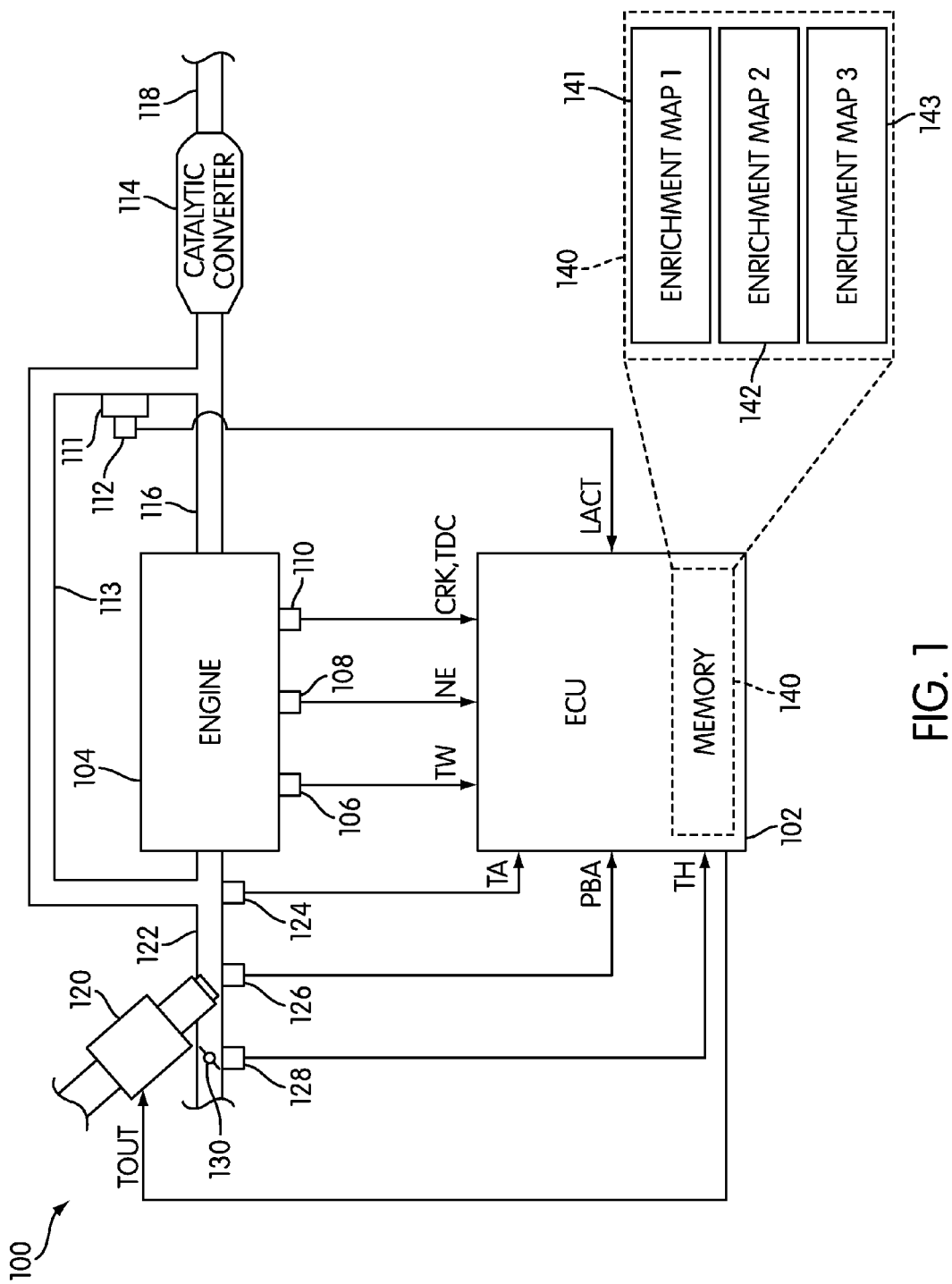
FIG. 1 is a schematic view of an embodiment of a control system for managing temperatures of an exhaust system in a motor vehicle.

FIG. 1 is a schematic view of an embodiment of a control system for managing temperatures of an exhaust system in a motor vehicle. For purposes of clarity, only some components of a motor vehicle may be shown. Furthermore, in other embodiments, additional components may be added or removed. As shown in FIG. 1, control system 100 for managing temperatures of an exhaust system may include provisions for communicating, and in some cases controlling, the various components associated with the motor vehicle. In some embodiments, control system 100 may be associated with a computer or similar device.

In the current embodiment, control system 100 may include an electronic control unit 102, hereby referred to as ECU 102. In some embodiments, ECU 102 may be a processor or similar device. In one embodiment, ECU 102 may be configured to communicate with, and/or control, various components of the motor vehicle. In an exemplary embodiment, ECU 102 may be configured to control systems and/or components associated with an engine 104, including, but not limited to an exhaust system, an air intake and fuel delivery system, and other systems and/or components. In addition, in some embodiments, ECU 102 may be configured to control additional components of a motor vehicle that are not shown.

In some embodiments, control system 100 may include sensors associated with various systems and/or components of the motor vehicle. In one embodiment, engine 104 may be provided with one or more sensors configured to provide information associated with various engine operating parameters. In an exemplary embodiment, an engine coolant sensor 106 may be configured to provide information associated with an engine coolant temperature TW, which is the temperature of an engine coolant circulating through the cylinder block of engine 104. Engine coolant sensor 106 may be configured to provide a signal associated with the engine coolant temperature TW to ECU 102. In an exemplary embodiment, an engine speed sensor 108 may be configured to provide information associated with a rotational speed NE of engine 104. Engine speed sensor 108 may be configured to provide a signal associated with the rotational speed NE to ECU 102. In some embodiments, control system 100 may further include a crank angle position sensor 110. Crank angle position sensor 110 may be configured to provide information associated with a crank angle CRK and/or a top dead center TDC position of a cylinder in engine 104. Crank angle position sensor 110 may be configured to provide a pulse signal associated with the crank angle CRK and/or the top dead center TDC position to ECU 102. In some cases, the rotational speed NE of engine 104 may be determined based on the pulse signal provided by crank angle sensor 110. In other cases, crank angle sensor 110 may be optional. In other embodiments, control system 100 may include a number of additional sensors configured to provide information associated with various other engine operating parameters.

In some embodiments, control system 100 may include an exhaust system associated with engine 104. In one embodiment, the exhaust system may include an exhaust passageway 116. Exhaust passageway 116 may be provided to allow exhaust emissions from engine 104 to be expelled. In some embodiments, the exhaust system may include a catalytic converter 114. Catalytic converter 114 may be provided in exhaust passageway 116 for purifying the emissions from engine 104. In some embodiments, catalytic converter 114 may remove pollutants present in the emissions from the combustion process, including, but not limited to CO, NOx, hydrocarbons, and other pollutants. Catalytic converter 114 may be any kind known in the art.

In some embodiments, catalytic converter 114 may include a number of components. In an exemplary embodiment, catalytic converter 114 may include a catalyst for treating the exhaust emissions to remove pollutants. In some cases, the catalyst provided in catalytic converter 114 may include a number of catalysts configured to provide different types of reactions. Catalytic converter 114 may include any type of catalyst and/or multiple catalysts as is known in the art. In some embodiments, catalytic converter 114 may include a seal mat. The seal mat may be a fiber or wire mesh disposed around the catalyst to seal the catalyst within the housing of catalytic converter 114. The seal mat may additionally provide heat and sound insulation for catalytic converter 114. In some cases, the seal mat may be configured to withstand elevated temperatures from the exhaust emissions from engine 104.

In some embodiments, control system 100 may include an exhaust gas recirculation mechanism 111. Exhaust gas recirculation mechanism 111 may be configured to recirculate exhaust gases from exhaust passageway 116 into an air intake passageway 122. In an exemplary embodiment, exhaust gas recirculation mechanism 111 may be associated with an EGR passageway 113 connecting between exhaust passageway 116 and air intake passageway 122. In some embodiments, exhaust gas recirculation mechanism 111 may further include an EGR control valve configured to open and close EGR passageway 113. In an exemplary embodiment, one end of EGR passageway 113 may open into exhaust passageway 116 at a location upstream of catalytic converter 114, and the other end of EGR passageway 113 may open into air intake passageway 122 at a location downstream of a throttle valve 130.

In some embodiments, exhaust gas recirculation mechanism 111 may include a linear solenoid type EGR control valve, which may be configured such that the lift changes linearly between the maximum value and the minimum value according to an EGR lift control input, thereby changing the degree of opening of the EGR passageway 113, i.e., the exhaust gas recirculation amount. In some embodiments, ECU 102 may be configured to generate the EGR lift control input to control the exhaust gas recirculation mechanism 111. In some embodiments, control system 100 may further include an EGR sensor 112. EGR sensor 112 may be configured to provide information associated with the EGR control valve position. EGR sensor 112 may be configured to provide a feedback signal associated with the amount of lift LACT of the EGR control valve to ECU 102. In other embodiments, other known types of EGR control valves may be used to control the exhaust gas recirculation amount. Similarly, various types of EGR sensors may be associated with different types of EGR control valves to provide feedback to ECU 102 for determining the exhaust gas recirculation amount.

In some embodiments, the exhaust system may further include a downstream exhaust passageway 118 provided to allow exhaust emissions to be expelled from catalytic converter 114. In different embodiments, additional components that are not shown may be associated with the exhaust system.

In some embodiments, the exhaust system may be provided with one or more sensors configured to provide information associated with various engine operating conditions. In some embodiments, one or more engine parameter sensors may be configured to indirectly determine conditions associated with the exhaust system. In an exemplary embodiment, ECU 102 may be configured to receive information from one or more engine parameter sensors, including, but not limited to engine coolant sensor 106, engine speed sensor 108, crank angle position sensor 110, EGR sensor 112, an air intake temperature sensor 124, an intake pressure sensor 126, throttle sensor 128, as well as other sensors associated with various engine operating conditions. In some embodiments, ECU 102 may use the received engine parameter inputs for estimating temperatures associated with the exhaust system. In an exemplary embodiment, ECU 102 may use received information from one or more of engine speed sensor 108, crank angle position sensor 110, EGR sensor 112, intake pressure sensor 126, and/or information associated with an ignition timing and fuel amount determined by ECU 102 or received from associated sensors to estimate temperatures associated with the exhaust system.

In other embodiments, one or more conditions associated with the exhaust system may be directly determined using dedicated sensors. In one embodiment, engine parameter sensors may include an exhaust temperature sensor that may be configured to provide information associated with an exhaust temperature TGAS, which is the temperature of exhaust emissions from engine 104. An exhaust temperature sensor may be configured to provide a signal associated with the exhaust temperature TGAS to ECU 102. In some cases, the exhaust temperature sensor may be disposed in exhaust passageway 116 between engine 104 and catalytic converter 114 for providing information associated with the temperature of the exhaust emissions prior to input into catalytic converter 114. In other cases, the exhaust temperature sensor may be disposed in downstream exhaust passageway 118 for providing information associated with the temperature of the exhaust emissions after being expelled from catalytic converter 114.

In other embodiments, the exhaust system may include multiple exhaust temperature sensors disposed at different locations in the exhaust system. In one embodiment, the exhaust system may include an exhaust temperature sensor disposed in exhaust passageway 116 before catalytic converter 114 and an exhaust temperature sensor disposed in downstream exhaust passageway 118 after catalytic converter 114. With this arrangement, the exhaust temperature sensors may be configured to provide information associated with the temperature of the exhaust emissions on either side of catalytic converter 114. In still other embodiments, an exhaust temperature sensor may be disposed in catalytic converter 114 for providing information associated with temperatures inside catalytic converter 114.

In some embodiments, control system 100 may include systems and/or components for providing air and fuel to engine 104. In one embodiment, control system 100 may include an air intake and fuel delivery system. In an exemplary embodiment, the air intake and fuel delivery system may include at least one fuel injector 120 associated with engine 104. Fuel injector 120 may be configured to deliver an amount of fuel to engine 104. In one embodiment, fuel injector 120 may be configured to receive a fuel injection time period TOUT signal from ECU 102. The fuel injection time period TOUT signal from ECU 102 may be associated with a fuel delivery amount for engine 104 determined by ECU 102.

In some embodiments, the air intake and fuel delivery system may include an air intake passageway 122 configured to provide a mixture of air and fuel to engine 104. The air intake and fuel delivery system also may include a throttle valve 130 disposed in air intake passageway 122. Throttle valve 130 may be configured to open and close so as to allow more or less air into air intake passageway 122.

In some embodiments, the air intake and fuel delivery system may be provided with one or more sensors configured to provide information associated with various air and fuel intake parameters. In an exemplary embodiment, an intake air temperature sensor 124 may be configured to provide information associated with an intake air temperature TA, which is the temperature of the air passing through air intake passageway 122 towards engine 104. Intake air temperature sensor 124 may be configured to provide a signal associated with the intake air temperature TA to ECU 102. In an exemplary embodiment, an intake pressure sensor 126 may be configured to provide information associated with an absolute pressure PBA of intake air passageway 122. Intake pressure sensor 126 may be configured to provide a signal associated with the absolute pressure PBA to ECU 102. In some embodiments, control system 100 may include a throttle sensor 128 associated with throttle valve 130. Throttle sensor 128 may be configured to provide information associated with a throttle position TH of throttle valve 130. In an exemplary embodiment, throttle sensor 128 may be configured to provide a signal associated with the throttle position TH to ECU 102. In other embodiments, control system 100 may include a number of additional sensors configured to provide information associated with various other air and fuel intake parameters.

In some embodiments, control system 100 may include a computer or a processor for receiving one or more signals from sensors associated with various systems and/or components of the motor vehicle and for using the signals to manage temperatures of the exhaust system. In one embodiment, ECU 102 may be configured to receive the signals from one or more of the sensors associated with engine 104, the exhaust system, and/or the air intake and fuel delivery system and to manage the temperatures of the exhaust system. In an exemplary embodiment, ECU 102 may include a memory 140. Memory 140 may include one or more fuel enrichment maps for managing temperatures of the exhaust system under different scenarios. In this embodiment, memory 140 may store three different fuel enrichment maps for managing temperatures of the exhaust system under three different scenarios. In one embodiment, memory 140 may include a first fuel enrichment map 141, a second fuel enrichment map 142, and a third fuel enrichment map 143. Each fuel enrichment map may include a fuel curve containing a plurality of fuel delivery amounts correlated to one or more parameters associated with engine 104 of the motor vehicle and configured to manage temperatures of the exhaust system.

FIGS. 2 through 4 illustrate representational views of various fuel enrichment scenarios for managing temperatures of the exhaust system associated with each of first fuel enrichment map 141, second fuel enrichment map 142, and third fuel enrichment map 143 discussed above.

Generally, temperatures associated with exhaust emissions in an exhaust system of a motor vehicle may reach elevated levels that can cause damage to one or more components of a catalytic converter that become overheated. Accordingly, a fuel enrichment process may be performed to prevent overheating of one or more components of the catalytic converter. Fuel enrichment increases the amount of fuel contained in the air/fuel ratio mixture that is supplied to the engine. A richer air/fuel mixture may lower the temperatures associated with exhaust emissions by using the properties of a fuel vaporization heat of the fuel as it vaporizes. The vaporization of the additional fuel in the air/fuel mixture acts to reduce the temperature of the exhaust emissions and may prevent overheating of one or more components of the catalytic converter.

Referring now to FIG. 2, a first fuel enrichment scenario 200 is illustrated. One or more of the various fuel enrichment scenarios discussed in the embodiments may be associated with information received from one or more sensors included in control system 100. In this embodiment, first fuel enrichment scenario 200 may be associated with information received from throttle sensor 128. In one embodiment, the information received from throttle sensor 128 may include a signal associated with a wide open throttle condition 202 of throttle valve 130.

In some embodiments, ECU 102 may be configured to select a fuel enrichment map stored in memory 140 appropriate for first fuel enrichment scenario 200. In an exemplary embodiment, ECU 102 may receive information from throttle sensor 128 associated with the wide open throttle condition 202 of throttle valve 130. In this embodiment, ECU 102 may be configured to select first fuel enrichment map 141 in response to receiving the information from throttle sensor 128.

In some embodiments, first fuel enrichment map 141 may include a fuel curve containing a plurality of fuel delivery amounts correlated to one or more parameters associated with engine 104 of the motor vehicle and configured to manage temperatures of the exhaust system under first fuel enrichment scenario 200. In this embodiment, first fuel enrichment map 141 includes a fuel curve for determining a fuel delivery amount based on the information received from throttle sensor 128 associated with the wide open throttle condition 202 of throttle valve 130. Additionally, a fuel delivery amount may be determined from the fuel curve and one or more operating parameters associated with engine 104. First fuel enrichment map 141 may be used by ECU 102 to generate a signal associated with the fuel delivery amount to control fuel injector 120.

As shown in FIG. 2, ECU 102 may send the signal associated with the fuel delivery amount obtained from first fuel enrichment map 141 to fuel injector 120. Fuel injector 120 may deliver an amount of fuel 204 associated with the signal from ECU 102 to engine 104. In this embodiment, amount of fuel 204 is selected based on the information received from throttle sensor 128 associated with the wide open throttle condition 202 of throttle valve 130. In some embodiments, amount of fuel 204 may also be determined based on the fuel curve and one or more operating parameters associated with engine 104.

In some embodiments, amount of fuel 204 delivered by fuel injector 120 under first fuel enrichment scenario 200 may be provided to manage temperatures of the exhaust system. In this embodiment, catalytic converter 114 processes the exhaust emissions from engine 104. In one embodiment, a number of pollutants 206 associated with amount of fuel 204 may be expelled from catalytic converter 114 as exhaust emissions. In an exemplary embodiment, the amount of pollutants 206 may vary in proportion to the amount of fuel delivered to engine 104. In other words, as the air/fuel mixture becomes richer, the number of pollutants contained in the exhaust emissions generally increases.

Referring now to FIG. 3, a second fuel enrichment scenario 300 is illustrated. In this embodiment, second fuel enrichment scenario 300 may be associated with information received from exhaust temperature sensor 112. In one embodiment, the information received from exhaust temperature sensor 112 may include a signal associated with a predicted overheat condition of the catalyst included in catalytic converter 114. In some embodiments, ECU 102 may be configured to select a fuel enrichment map stored in memory 140 appropriate for second fuel enrichment scenario 300.

In an exemplary embodiment, ECU 102 may be configured to receive information associated with the operating conditions of engine 104 from a plurality of engine parameter sensors and to predict the overheat condition of the catalyst, as described in more detail below. In other cases, ECU 102 may receive information associated with the exhaust temperature of the exhaust system from an exhaust temperature sensor. In one embodiment, ECU 102 may be configured to select second fuel enrichment map 142 in response to receiving the information from exhaust temperature sensor 112 associated with the predicted overheat condition of the catalyst.

In some embodiments, second fuel enrichment map 142 may include a fuel curve containing a plurality of fuel delivery amounts correlated to one or more parameters associated with engine 104 of the motor vehicle and configured to manage temperatures of the exhaust system under second fuel enrichment scenario 300. In this embodiment, second fuel enrichment map 142 includes a fuel curve for determining a fuel delivery amount based on the information from exhaust temperature sensor 112 associated with the predicted overheat condition of the catalyst. Additionally, a fuel delivery amount may be determined from the fuel curve and one or more operating parameters associated with engine 104. Second fuel enrichment map 142 may be used by ECU 102 to generate a signal associated with the fuel delivery amount to control fuel injector 120.

As shown in FIG. 3, ECU 102 may send the signal associated with the fuel delivery amount obtained from second fuel enrichment map 142 to fuel injector 120. Fuel injector 120 may deliver an amount of fuel 304 associated with the signal from ECU 102 to engine 104. In this embodiment, amount of fuel 304 is selected based on the information received from exhaust temperature sensor 112 associated with the predicted overheat condition of the catalyst. In one embodiment, amount of fuel 304 may be smaller than amount of fuel 204 associated with first fuel enrichment map 141 under first fuel enrichment scenario 200 above.

In some embodiments, amount of fuel 304 delivered by fuel injector 120 under second fuel enrichment scenario 300 may be provided to manage temperatures of the exhaust system. In some embodiments, amount of fuel 304 may be determined so as to reduce the temperatures of the exhaust emissions to prevent overheating the catalyst. In this embodiment, catalytic converter 114 processes the exhaust emissions from engine 104. In one embodiment, a number of pollutants 306 associated with amount of fuel 304 may be expelled from catalytic converter 114 as exhaust emissions. In an exemplary embodiment, the amount of pollutants 306 associated with amount of fuel 304 may be less than the amount of pollutants 206 associated with amount of fuel 204 associated with first fuel enrichment scenario 200. With this arrangement, amount of fuel 304 may be selected to manage temperatures of the exhaust system and to reduce emissions of pollutants from the exhaust system.

Referring now to FIG. 4, a third fuel enrichment scenario 400 is illustrated. In this embodiment, third fuel enrichment scenario 400 may be associated with information received from exhaust temperature sensor 112. In one embodiment, the information received from exhaust temperature sensor 112 may include a signal associated with a predicted overheat condition of the seal mat included in catalytic converter 114. In some embodiments, ECU 102 may be configured to select a fuel enrichment map stored in memory 140 appropriate for third fuel enrichment scenario 400.

In an exemplary embodiment, ECU 102 may be configured to receive the information associated with the exhaust temperature of the exhaust system from exhaust temperature sensor 112 and to predict the overheat condition of the seal mat, as described in more detail below. In one embodiment, ECU 102 may be configured to select third fuel enrichment map 143 in response to receiving the information from exhaust temperature sensor 112 associated with the predicted overheat condition of the seal mat.

In some embodiments, third fuel enrichment map 143 may include a fuel curve containing a plurality of fuel delivery amounts correlated to one or more parameters associated with engine 104 of the motor vehicle and configured to manage temperatures of the exhaust system under third fuel enrichment scenario 400. In this embodiment, third fuel enrichment map 143 includes a fuel curve for determining a fuel delivery amount based on the information from exhaust temperature sensor 112 associated with the predicted overheat condition of the seal mat. Additionally, a fuel delivery amount may be determined from the fuel curve and one or more operating parameters associated with engine 104. Third fuel enrichment map 143 may be used by ECU 102 to generate a signal associated with the fuel delivery amount to control fuel injector 120.

As shown in FIG. 4, ECU 102 may send the signal associated with the fuel delivery amount obtained from third fuel enrichment map 143 to fuel injector 120. Fuel injector 120 may deliver an amount of fuel 404 associated with the signal from ECU 102 to engine 104. In this embodiment, amount of fuel 404 is selected based on the information received from exhaust temperature sensor 112 associated with the predicted overheat condition of the seal mat. In one embodiment, amount of fuel 404 may be larger than amount of fuel 304 associated with second fuel enrichment map 142 under second fuel enrichment scenario 300 above. In some embodiments, amount of fuel 404 may be substantial equal to or greater than amount of fuel 204 associated with first fuel enrichment map 141 under first fuel enrichment scenario 200 above.

In some embodiments, amount of fuel 404 delivered by fuel injector 120 under third fuel enrichment scenario 400 may be provided to manage temperatures of the exhaust system. In some embodiments, amount of fuel 404 may be determined so as to reduce the temperatures of the exhaust emissions to prevent overheating the seal mat. In one embodiment, amount of fuel 404 may be larger than amount of fuel 304 to account for higher temperatures associated with the overheat condition of the seal mat than the temperatures associated with the overheat condition of the catalyst. With this arrangement, the larger amount of fuel 404 may be provided to reduce temperatures of the exhaust system to a greater degree than the smaller amount of fuel associated with amount of fuel 304.

In this embodiment, catalytic converter 114 processes the exhaust emissions from engine 104. In one embodiment, a number of pollutants 406 associated with amount of fuel 404 may be expelled from catalytic converter 114 as exhaust emissions. In an exemplary embodiment, the amount of pollutants 406 associated with amount of fuel 404 may be more than the amount of pollutants 306 associated with amount of fuel 304 associated with second fuel enrichment scenario 300. With this arrangement, amount of fuel 404 may be selected to manage temperatures of the exhaust system to prevent the overheat condition of the seal mat, but may result in larger emissions of pollutants from the exhaust system than under second fuel enrichment scenario 300.

FIG. 5 illustrates a representational view of an exemplary relationship between first fuel enrichment map 141, second fuel enrichment map 142, and third fuel enrichment map 143. In some embodiments, each of first fuel enrichment map 141, second fuel enrichment map 142, and third fuel enrichment map 143 may include a fuel curve containing a plurality of fuel delivery amounts correlated to one or more parameters associated with engine 104 of the motor vehicle. In an exemplary embodiment, each of first fuel enrichment map 141, second fuel enrichment map 142, and third fuel enrichment map 143 further may be configured to manage temperatures of the exhaust system in motor vehicle under different scenarios. In other embodiments, control system 100 may use additional fuel enrichment maps configured to manage temperatures and/or other conditions associated with various systems and/or components associated with engine 104. In some cases, the plurality of fuel enrichment maps, including first fuel enrichment map 141, second fuel enrichment map 142, and third fuel enrichment map 143, may be stored in memory 140 associated with ECU 102. In other cases, one or more fuel enrichment maps may be stored in memory associated with other devices and/or components.

In some embodiments, each fuel enrichment map may be configured to correlate a fuel curve containing a plurality of fuel delivery amounts with various parameters associated with an engine. In one embodiment, fuel enrichment maps may correlate a fuel curve containing a plurality of fuel delivery amounts with an engine speed NE associated with the rotational speed of an engine and an absolute pressure PBA associated with the intake pressure of an intake air passageway. In an exemplary embodiment, the fuel curve may be configured to increase in relation with an increase in engine speed NE and/or absolute pressure PBA. In other embodiments, different parameters associated with an engine may be used to correlate a fuel curve containing a plurality of fuel delivery amounts. In different embodiments, the fuel curve may be configured to increase linearly, exponentially, or in any other relation to one or more of the parameters associated with the engine.

In some embodiments, each fuel enrichment map may be created by using test data to correlate the fuel curve containing the plurality of fuel delivery amounts to the parameters associated with the engine. In other embodiments, one or more mathematical formulae or relations may used to correlate the fuel curve containing the plurality of fuel delivery amounts to the parameters associated with the engine to create a fuel enrichment map. In an exemplary embodiment, the fuel enrichment maps may be correlated to establish a fuel curve containing fuel delivery amounts associated with providing a reduction in temperature to manage temperatures in the exhaust system under different scenarios.

Referring again to FIG. 5, in an exemplary embodiment, third fuel enrichment map 143 may be configured to correlate a fuel curve 500 containing a plurality of fuel delivery amounts with engine speed NE and absolute pressure PBA. In some embodiments, third fuel enrichment map 143 may be configured so as to provide a fuel curve containing a plurality of fuel delivery amounts associated with managing temperatures of the exhaust system associated with an overheat condition of a seal mat of a catalytic converter. In this embodiment, fuel curve 500 is associated with a relatively rich air/fuel mixture for providing a fuel delivery amount associated with an overheat condition of a seal mat of a catalytic converter. ECU 102 may generate a signal associated with a commanded fuel delivery amount for fuel injector 120 using fuel curve 500 and information received from one or more sensors associated with engine 104. In an exemplary embodiment, ECU 102 may determine a fuel delivery amount based on third fuel enrichment map 143, a signal containing information associated with absolute pressure PBA received from intake pressure sensor 126, and/or a signal containing information associated with engine speed NE received from engine speed sensor 108. In other embodiments, additional signals containing information associated with various other sensors associated with the motor vehicle may be used to determine a fuel delivery amount.

In some embodiments, first fuel enrichment map 141 may be configured so as to provide a fuel curve 502 containing a plurality of fuel delivery amounts associated with managing temperatures of the exhaust system under a wide open throttle condition. In this embodiment, fuel curve 502 is associated with a relatively rich air/fuel mixture for providing a fuel delivery amount associated with a wide open throttle condition. In some embodiments, fuel curve 502 may be substantially equal to fuel curve 500 included in third enrichment map 143. In other embodiments, fuel curve 502 may be less rich than fuel curve 500. In other words, fuel curve 502 may be configured to provide a plurality of fuel delivery amounts containing less fuel as those associated with fuel curve 500.

In some embodiments, ECU 102 may generate a signal associated with a commanded fuel delivery amount for fuel injector 120 using fuel curve 502 and information received from one or more sensors associated with engine 104. In an exemplary embodiment, ECU 102 may determine a fuel delivery amount based on first fuel enrichment map 141, a signal containing information associated with absolute pressure PBA received from intake pressure sensor 126, and/or a signal containing information associated with engine speed NE received from engine speed sensor 108. In other embodiments, additional signals containing information associated with various other sensors associated with the motor vehicle may be used to determine a fuel delivery amount.

In some embodiments, second fuel enrichment map 142 may be configured so as to provide a fuel curve 504 containing a plurality of fuel delivery amounts associated with managing temperatures of the exhaust system associated with an overheat condition of a catalyst of a catalytic converter. In this embodiment, fuel curve 504 is associated with a slightly rich air/fuel mixture for providing a fuel delivery amount associated with a catalyst overheat condition. In some embodiments, fuel curve 504 may be substantially less than fuel curve 500 included in third enrichment map 143 and/or fuel curve 502 included in first enrichment map 141. In other embodiments, fuel curve 504 may be less rich than fuel curve 500 and/or fuel curve 502. In other words, fuel curve 504 may be configured to provide a plurality of fuel delivery amounts containing less fuel as those associated with fuel curve 500 and/or fuel curve 502.

In some embodiments, ECU 102 may generate a signal associated with a commanded fuel delivery amount for fuel injector 120 using fuel curve 504 and information received from one or more sensors associated with engine 104. In an exemplary embodiment, ECU 102 may determine a fuel delivery amount based on second fuel enrichment map 142, a signal containing information associated with absolute pressure PBA received from intake pressure sensor 126, and/or a signal containing information associated with engine speed NE received from engine speed sensor 108. In other embodiments, additional signals containing information associated with various other sensors associated with the motor vehicle may be used to determine a fuel delivery amount.

With this arrangement, second fuel enrichment map 142 may be provided to be used under fuel enrichment scenarios where less fuel is needed to manage temperatures in an exhaust system. In this embodiment, fuel curve 504 containing the plurality of fuel delivery amounts is configured to provide less excess fuel to engine 104. As a result, the amount of pollutants contained in the exhaust emissions passing through the catalytic converter may be reduced. In other embodiments, additional fuel enrichment maps may be provided to reduce excess fuel and to reduce the amounts of pollutants contained in the exhaust emissions for other scenarios as those described in the current embodiments.

Figure 6:
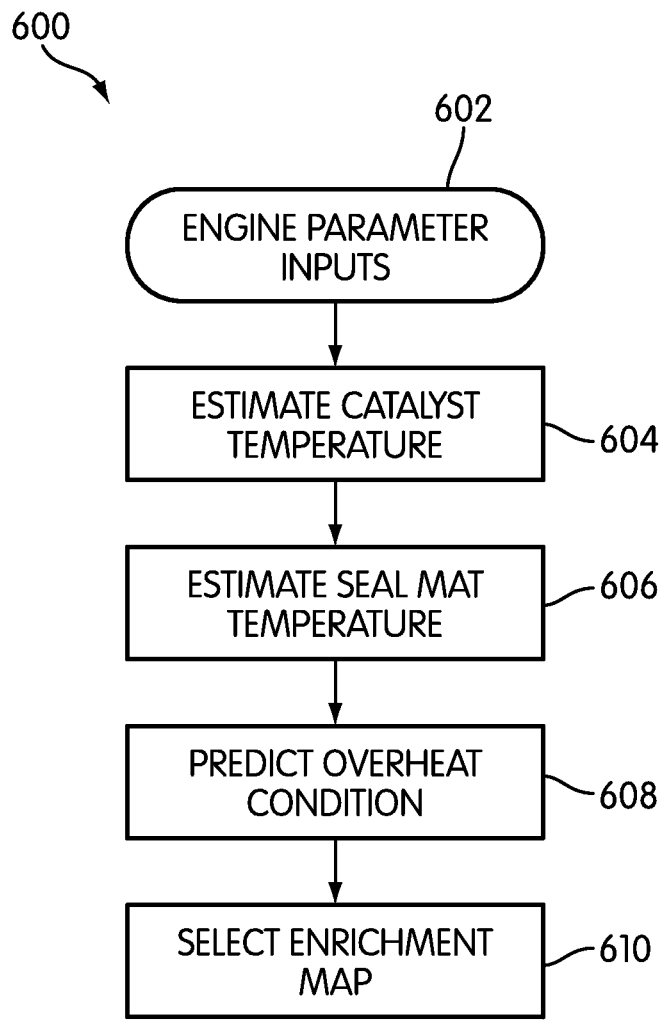
FIG. 6 is a schematic view of an embodiment of a process for managing temperatures of an exhaust system in a motor vehicle.

FIG. 6 illustrates a schematic view of an embodiment of a process 600 for managing temperatures of an exhaust system in a motor vehicle. The order of the steps included in process 600 is merely exemplary and may be performed in any order. In some embodiments, the motor vehicle may include a control system 100 configured to perform process 600 for managing temperatures in an exhaust system. In an exemplary embodiment, process 600 may be performed by ECU 102. In one embodiment, information associated with engine 104 from a plurality of engine parameter sensors may be provided at step 602. In an exemplary embodiment, exhaust temperatures of the exhaust system may be estimated by ECU 102 based on signals associated with engine parameter inputs received from engine speed sensor 108, crank angle position sensor 110, EGR sensor 112, intake pressure sensor 126, and/or information associated with an ignition timing and fuel amount determined by ECU 102 or received from associated sensors. In other embodiments, an exhaust temperature sensor may be configured to provide a signal associated with the exhaust temperature to ECU 102.

Next, at step 604, the temperature associated with a catalyst of the catalytic converter may be estimated. In one embodiment, ECU 102 may use the information associated with the estimate of exhaust temperature from step 602 to estimate the value associated with the temperature of the catalyst. In other embodiments, information associated with a measured value of the exhaust temperature of the exhaust system at a location after the catalytic converter may be used to estimate the value associated with the temperature of the catalyst. Similarly, at step 606, the temperature associated with a seal mat of the catalytic converter may be estimated. In one embodiment, ECU 102 may use the information associated with the estimate of exhaust temperature from step 602 to estimate the value associated with the temperature of the seal mat. In other embodiments, information associated with the measured value of the temperature in the catalytic converter may be used to estimate the value associated with the temperature of the seal mat.

Process 600 may include a step of predicting an overheat condition 608. In some embodiments, one or more of an overheat condition of the catalyst and the seal mat of the catalytic converter may be predicted at step 608. In an exemplary embodiment, ECU 102 may be configured to predict the overheat condition of the catalyst and/or seal mat based on the values associated with the temperatures of the catalyst and seal mat estimated at step 604 and/or step 606.

In one embodiment, ECU 102 may predict an overheat condition at step 608 using threshold values associated with overheat conditions of each of the catalyst and the seal mat. In an exemplary embodiment, ECU 102 may be configured to compare the estimated value associated with the temperature of the catalyst determined at step 604 with a first overheat threshold. In this embodiment, the first overheat threshold may be associated with a temperature at which overheating of, and/or damage to, the catalyst may occur.

Similarly, ECU 102 may be configured to compare the estimated value associated with the temperature of the seal mat determined at step 606 with a second overheat threshold. In this embodiment, the second overheat threshold may be associated with a temperature at which overheating of, and/or damage to, the seal mat may occur. In an exemplary embodiment, the second overheat threshold may be larger than the first overheat threshold.

In some cases, the first overheat threshold and/or the second overheat threshold may be a fixed value. In other cases, the first overheat threshold and/or the second overheat threshold may be variable. In still other cases, the first overheat threshold and/or the second overheat threshold may be determined based on information received from one or more sensors included in control system 100.

Finally, at step 610, a fuel enrichment map may be selected. In some embodiments, the fuel enrichment map may be selected based on the predicted overheat condition determined at step 608. In an exemplary embodiment, a different fuel enrichment map may be selected for each of a predicted catalyst overheat condition and a predicted seal mat overheat condition. In one embodiment, if a predicted catalyst overheat condition is determined at step 608, then second fuel enrichment map 142 may be selected by ECU 102 at step 610. Similarly, if a predicted seal mat overheat condition is determined at step 608, then third fuel enrichment map 143 may be selected by ECU 102 at step 610. ECU 102 may then use second fuel enrichment map 142 and/or third fuel enrichment map 143 to determine a fuel delivery amount for fuel injector 120 as discussed above. With this arrangement, the fuel delivery amount determined from the second fuel enrichment map 142 and/or third fuel enrichment map 143 may be configured to reduce the temperature associated with the catalyst and/or seal mat and prevent or eliminate the predicted overheat condition.

Figure 7:
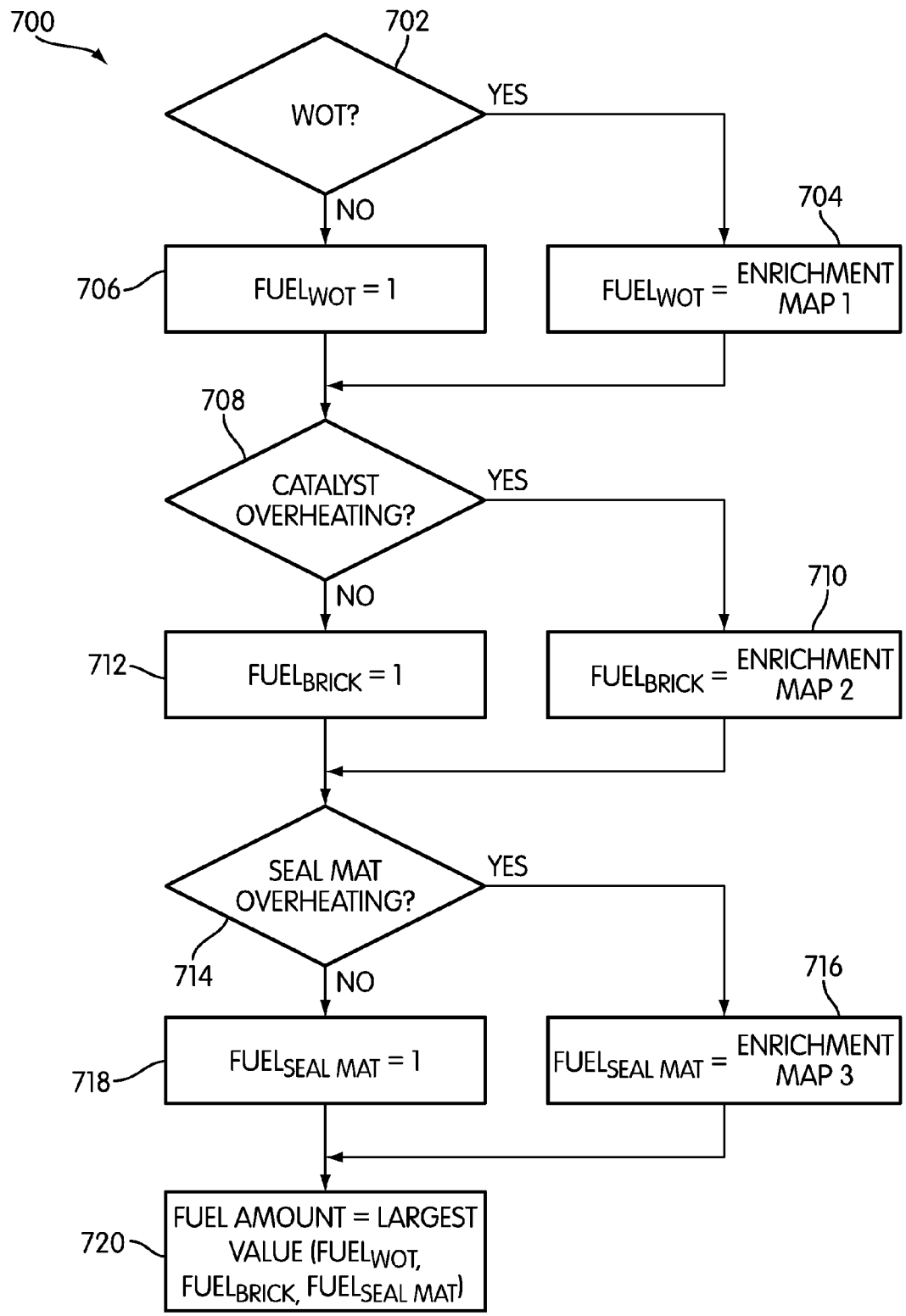
FIG. 7 is a schematic view of an embodiment of a process for generating a signal for a fuel injector to manage temperatures of an exhaust system in a motor vehicle.

FIG. 7 illustrates an embodiment of a process 700 for generating a signal for at least one fuel injector to manage temperatures of an exhaust system in a motor vehicle. The order of the steps included in process 700 is merely exemplary and may be performed in any order. In some embodiments, the motor vehicle may include a control system 100 configured to perform process 700 for generating a signal for at least one fuel injector to manage temperatures in an exhaust system. In an exemplary embodiment, process 700 may be performed by ECU 102. In some embodiments, ECU 102 may be configured to generate a signal associated with a fuel delivery amount determined based on one or more fuel enrichment maps discussed above. In an exemplary embodiment, ECU 102 may use process 700 for generating the signal associated with a commanded fuel delivery amount to send to fuel injector 120.

In some embodiments, process 700 may include a step 702 of determining whether information associated with a throttle position indicates a wide open throttle condition. In an exemplary embodiment, ECU 102 may receive the information associated with the throttle position from throttle sensor 128. If at step 702, ECU 102 determines that a wide open throttle condition exists, then at step 704, a fuel delivery amount associated with the wide open throttle (WOT) may be set based on first fuel enrichment map 141, as discussed above. On the other hand, if a wide open throttle condition does not exist, then at step 706, a fuel delivery amount associated with a baseline value may be set. In this embodiment, the baseline value may be set at 1.

In some embodiments, the fuel delivery amount may be configured as a factor multiplying a baseline fuel delivery amount. In this embodiment, the fuel delivery amount may be determined by multiplying the baseline fuel delivery amount with the fuel delivery amount factor determined based on the appropriate fuel enrichment map. With this arrangement, when a baseline factor of 1 is set, the baseline fuel delivery amount remains unchanged.

Next, at step 708, ECU 102 may determine whether the catalyst is in a predicted overheat condition, as described above. If the catalyst is in a predicted overheat condition, then at step 710, a fuel delivery amount associated with the catalyst overheat condition (BRICK) may be set based on second fuel enrichment map 142, as discussed above. On the other hand, if the catalyst is not predicted to be in an overheat condition, then at step 712, a fuel delivery amount associated with the baseline value may be set.

Similarly, at step 714, ECU 102 may determine whether the seal mat is in a predicted overheat condition, as described above. If the seal mat is in a predicted overheat condition, then at step 716, a fuel delivery amount associated with the seal mat overheat condition (SEAL MAT) may be set based on third fuel enrichment map 143, as discussed above. On the other hand, if the seal mat is not predicted to be in an overheat condition, then at step 718, a fuel delivery amount associated with the baseline value may be set.

Lastly, at step 720, ECU 102 may be configured to select the largest of the fuel delivery amounts set at any of step 704, step 706, step 710, step 712, step 716, and step 718. In some embodiments, ECU 102 may use the selected largest fuel delivery amount to determine a commanded fuel delivery amount for one or more fuel injectors associated with engine 104. In this embodiment, ECU 102 may generate a signal associated with the commanded fuel delivery amount to control at least fuel injector 120 to deliver the commanded amount of fuel to engine 104. ECU 102 may send the generated signal as a fuel injection time period TOUT to fuel injector 120 to deliver the commanded amount of fuel to engine 104 and to manage the temperatures of the exhaust system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for managing temperatures in an exhaust system of a motor vehicle by an electronic control unit, comprising the steps of:

receiving information associated with a throttle position from a throttle sensor;

receiving information associated with an engine of the motor vehicle from a plurality of engine parameter sensors;

estimating a first value associated with a temperature of a catalyst disposed in a catalytic converter included in the exhaust system;

estimating a second value associated with a temperature of a seal mat disposed in the catalytic converter;

predicting an overheat condition of at least one of the catalyst, based on the estimated first value, and the seal mat, based on the estimated second value;

determining an optimal fuel delivery amount based on information received from the throttle sensor, the predicted overheat condition of the catalyst, and the predicted overheat condition of the seal mat;

selecting the optimal fuel delivery amount between: (i) a first fuel delivery amount based on information received from the throttle sensor, (ii) a second fuel delivery amount based on the predicted overheat condition of the catalyst, and (iii) a third fuel delivery amount based on the predicted overheat condition of the seal mat, the first fuel delivery amount and the third fuel delivery amount each being larger than the second fuel delivery amount;

generating a signal associated with the selected at least one of the first fuel delivery amount, the second fuel delivery amount, and the third fuel delivery amount to control at least one fuel injector associated with the engine of the motor vehicle; and sending the signal to the at least one fuel injector.

2. The method according to claim 1, wherein the electronic control unit further comprises a memory for storing a plurality of fuel enrichment maps, each of the fuel enrichment maps comprising a fuel curve correlated to one or more parameters associated with the engine of the motor vehicle and configured to manage temperatures of the exhaust system.

3. The method according to claim 2, wherein the first fuel delivery amount is determined based on a first fuel enrichment map associated with a wide-open throttle condition, the second fuel delivery amount is determined based on a second fuel enrichment map associated with an overheat condition of the catalyst, and the third fuel delivery amount is determined based on a third fuel enrichment map associated with an overheat condition of the seal mat.

4. The method according to claim 3, wherein the first fuel delivery amount is based on information received from the throttle sensor associated with the wide-open throttle condition.

5. The method according to claim 3, wherein the first fuel enrichment map and the third fuel enrichment map each include fuel curves associated with a richer air/fuel mixture than the fuel curve included in the second fuel enrichment map.

6. The method according to claim 1, wherein the step of predicting the overheat condition further comprises:

comparing the estimated first value associated with the temperature of the catalyst to a first overheat threshold;

comparing the estimated second value associated with the temperature of the seal mat to a second overheat threshold;

predicting the catalyst overheat condition if the estimated first value is greater than the first overheat threshold;

predicting the seal mat overheat condition if the estimated second value is greater than the second overheat threshold; and wherein the second overheat threshold is larger than the first overheat threshold.

7. The method according to claim 1, wherein the fuel delivery amount is greater than or equal to the first fuel delivery amount.

8. A method for managing temperatures in an exhaust system of a motor vehicle by an electronic control unit, wherein the electronic control unit comprises a memory for storing a plurality of fuel enrichment maps, each of the fuel enrichment maps comprising a fuel curve correlated to one or more parameters associated with the engine of the motor vehicle and configured to manage temperatures of the exhaust system, the method comprising the steps of:

receiving information associated with a throttle position from a throttle sensor;

setting a first fuel delivery amount based on the information received from the throttle sensor, wherein the first fuel delivery amount is determined based on a first fuel enrichment map associated with a wide-open throttle condition;

receiving information associated with an engine of the motor vehicle from a plurality of engine parameter sensors;

predicting an overheat condition of a catalyst disposed in a catalytic converter included in the exhaust system based on the information received from the plurality of engine parameter sensors;

setting a second fuel delivery amount based on the predicted overheat condition of the catalyst, wherein the second fuel delivery amount is determined based on a second fuel enrichment map associated with the predicted overheat condition of the catalyst;

predicting an overheat condition of a seal mat disposed in the catalytic converter based on the information received from the plurality of engine parameter sensors;

setting a third fuel delivery amount based on the predicted overheat condition of the seal mat, wherein the third fuel delivery amount is determined based on a third fuel enrichment map associated with the predicted overheat condition of the seal mat;

wherein the first fuel enrichment map and the third fuel enrichment map each include fuel curves associated with a richer air/fuel mixture than the fuel curve included in the second fuel enrichment map;

selecting the largest of the first fuel delivery amount, the second fuel delivery amount, and the third fuel delivery amount as a commanded fuel delivery amount;

generating a signal associated with the commanded fuel delivery amount to control at least one fuel injector associated with an engine of the motor vehicle; and sending the signal to the at least one fuel injector.

9. The method according to claim 8, wherein the signal associated with the commanded fuel delivery amount relates to a fuel injection time period.

10. The method according to claim 9, wherein at least one of the plurality of engine parameter sensors is an exhaust temperature sensor.

11. The method according to claim 8 wherein the plurality of engine parameter sensors includes an intake pressure sensor and an engine speed sensor.

12. The method according to claim 8, wherein the step of predicting the overheat condition of the catalyst further comprises:

estimating a first value associated with a temperature of the catalyst based on the information received from the plurality of engine parameter sensors;

comparing the estimated first value to a first overheat threshold; and predicting the overheat condition of the catalyst if the estimated first value is greater than the first overheat threshold.

13. The method according to claim 12, wherein the step of predicting the overheat condition of the seal mat further comprises:
estimating a second value associated with a temperature of the seal mat based on the information received from the plurality of engine parameter sensors;
comparing the estimated second value to a second overheat threshold;
predicting the seal mat overheat condition if the estimated second value is greater than the second overheat threshold; and
wherein the second overheat threshold is larger than the first overheat threshold.

14. A control system in a motor vehicle for managing temperatures in an exhaust system of the motor vehicle, comprising:
an engine including at least one fuel injector and a plurality of engine parameter sensors configured to transmit information associated with operating conditions of the engine;
a throttle sensor configured to transmit information associated with a throttle position of the engine;
an exhaust system comprising a catalytic converter including a catalyst and a seal mat;
an electronic control unit in communication with the at least one fuel injector, the throttle sensor, and the plurality of engine parameter sensors;
the electronic control unit configured to estimate a first value associated with a temperature of the catalyst and a second value associated with a temperature of the seal mat, and to predict an overheat condition of at least one of the catalyst and the seal mat, based on the first value and the second value;
wherein the electronic control unit is configured to determine an optimal fuel delivery amount based on information received from the throttle sensor, the predicted overheat condition of the catalyst, and the predicted overheat condition of the seal mat;
wherein the electronic control unit is configured to select the optimal fuel delivery amount between: (i) a first fuel delivery amount based on information received from the throttle sensor, (ii) a second fuel delivery amount based on the predicted overheat condition of the catalyst, and (iii) a third fuel delivery amount based on the predicted overheat condition of the seal mat, the first fuel delivery amount and the third fuel delivery amount each being larger than the second fuel delivery amount;
wherein the electronic control unit is configured to generate a signal associated with the selected at least one of the first fuel delivery amount, the second fuel delivery amount, and the third fuel delivery amount to control the at least one fuel injector.

15. The system according to claim 14, wherein the electronic control unit further comprises a memory for storing a plurality of fuel enrichment maps, each of the fuel enrichment maps comprising a fuel curve correlated to one or more parameters associated with the engine of the motor vehicle and configured to manage temperatures of the exhaust system.

16. The system according to claim 15, wherein the first fuel delivery amount is determined based on a first fuel enrichment map associated with a wide-open throttle condition, the second fuel delivery amount is determined based on a second fuel enrichment map associated with an overheat condition of the catalyst, and the third fuel delivery amount is determined based on a third fuel enrichment map associated with an overheat condition of the seal mat.

17. The system according to claim 16, wherein the first fuel delivery amount is based on information received from the throttle sensor associated with the wide open throttle condition.

18. The system according to claim 16, wherein the first fuel enrichment map and the third fuel enrichment map each include fuel curves associated with a richer air/fuel mixture than the fuel curve included in the second fuel enrichment map.

19. The system according to claim 14, wherein the electronic control unit is further configured to:
compare the estimated first value associated with the temperature of the catalyst to a first overheat threshold;
compare the estimated second value associated with the temperature of the seal mat to a second overheat threshold;
predict the catalyst overheat condition if the estimated first value is greater than the first overheat threshold;
predict the seal mat overheat condition if the estimated second value is greater than the second overheat threshold; and
wherein the second overheat threshold is larger than the first overheat threshold.

20. The system according to claim 14, wherein the first fuel delivery amount is greater than or equal to the third fuel delivery amount.

* * * * *